United States Patent
Muraoka (10) Patent No.: US 6,256,510 B1
(45) Date of Patent: Jul. 3, 2001

(54) MOBILE RADIO COMMUNICATION APPARATUS CAPABLE OF REDUCING POWER DISSIPATION

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/145,453

(22) Filed: Sep. 2, 1998

(30) Foreign Application Priority Data

Sep. 2, 1997 (JP) .................................................. 9-254380

(51) Int. Cl.$^7$ ....................................................... H04B 7/20
(52) U.S. Cl. ............................................... 455/522; 455/574
(58) Field of Search ............................ 455/78, 575, 127, 455/343, 522, 574, 69

(56) References Cited

U.S. PATENT DOCUMENTS

| | | | | |
|---|---|---|---|---|
| 5,001,776 | * | 3/1991 | Clark ...................................... | 455/226 |
| 5,134,708 | * | 7/1992 | Marui et al. ........................ | 455/33.2 |
| 5,566,165 | * | 10/1996 | Swahashi et al. ...................... | 370/18 |
| 6,021,207 | * | 2/2000 | Puthuff et al. ....................... | 381/330 |
| 6,031,828 | * | 2/2000 | Koro et al. ............................ | 370/336 |
| 6,034,952 | * | 3/2000 | Dohi et al. ............................. | 370/335 |
| 6,070,086 | * | 5/2000 | Dobrica .................................. | 455/522 |

FOREIGN PATENT DOCUMENTS

| | | |
|---|---|---|
| 57-97249 | 6/1982 | (JP) . |
| 60-116239 | 6/1985 | (JP) . |
| 2-94824 | 4/1990 | (JP) . |
| 6-13955 | 1/1994 | (JP) . |
| 6-21845 | 1/1994 | (JP) . |
| 7-11148 | 4/1995 | (JP) . |
| 7-222231 | 8/1995 | (JP) . |
| 7-288501 | 10/1995 | (JP) . |
| 8-237194 | 9/1996 | (JP) . |

OTHER PUBLICATIONS

Japanese Office Action dated Oct. 5, 2000, with partial English translation.

* cited by examiner

Primary Examiner—Nguyen T. Vo
Assistant Examiner—N. Mehrpour
(74) Attorney, Agent, or Firm—McGinn & Gibb, PLLC (57) ABSTRACT

In a mobile radio communication apparatus, including a transmission circuit for intermittently transmitting first significant signals and a reception circuit for receiving second significant signals, a control circuit changes a strength of the first significant signals in accordance with a strength of the second significant signals only when the second significant signals are being received by the reception circuit.

19 Claims, 8 Drawing Sheets

MOBILE RADIO COMMUNICATION APPARATUS CAPABLE OF REDUCING POWER DISSIPATION

BACKGROUND OF THE INVENTION

1. Field of the Invention

The present invention relates to a mobile radio communication apparatus such as a portable telephone and a mobile satellite communication terminal.

2. Description of the Related Art

A mobile radio communication apparatus is usually powered by a battery, and accordingly, in order to increase a time period of operation per one battery, the reduction of the power dissipation is an important issue.

In a prior art mobile radio communication system where two mobile stations communicate with each other, when an intensity of a received signal is large, it is considered that the distance between the two mobile stations is small or the transmission state is good, so that the transmission power is decreased (see JP-A-6-13955). Thus, the transmission power of the radio wave signals transmitted between the mobile stations and can always be minimum, which decreases the power dissipation. This will be explained later in detail.

In the prior art mobile radio communication system, however, in order to decrease the power dissipation, if each of the mobile stations has a burst function for intermittently transmitting signals only when significant transmitting data occurs, the power dissipation is rather increased. That is, even when one of the mobile stations and stops transmitting of signals due to the absence of effective transmitting data, the transmission power control section of the other mobile station continues to increase the transmission power of signals. As a result, the power dissipation is rather increased.

In addition, if each of the mobile stations is a mobile satellite terminal, the antenna of each of the mobile stations should be directed to a satellite. Therefore, when the direction of the antenna of one of the mobile stations is deviated from the satellite, the direction of the antenna should be corrected, however, in the prior art mobile radio communication system, the other mobile station continues to increase the transmission power of signals, which also increases the power dissipation.

SUMMARY OF THE INVENTION

It is an object of the present invention to decrease the power dissipation in a mobile radio communication apparatus where mobile stations intermittently transmit signals, i.e., radio wave signals are transmitted in a burst state.

Another object is to decrease the power dissipation in a mobile radio communication apparatus where the direction of an antenna is deviated from a satellite.

According to the present invention, in a mobile radio communication apparatus including a transmission circuit for intermittently transmitting first significant signals and a reception circuit for receiving second significant signals, a control circuit changes a strength of the first significant signals in accordance with a strength of the second significant signals only when the second significant signals are being received by the reception circuit.

Also, in a mobile radio communication apparatus including a transmission circuit for intermittently transmitting first significant signals and a reception circuit for receiving second significant signals, a control circuit stops transmission of the first significant signals when the strength of the second significant signals is decreased by an amount larger than a predetermined value.

BRIEF DESCRIPTION OF THE DRAWINGS

The present invention will be more clearly understood from the description as set forth below, as compared will the prior art, with reference to the accompanying drawings, wherein.

DESCRIPTION OF THE PREFERRED EMBODIMENTS

Before the description of the preferred embodiments, a prior art mobile radio communication system will be explained with reference to FIG. 1 (see JP-A-6-13955).

Figure 1:
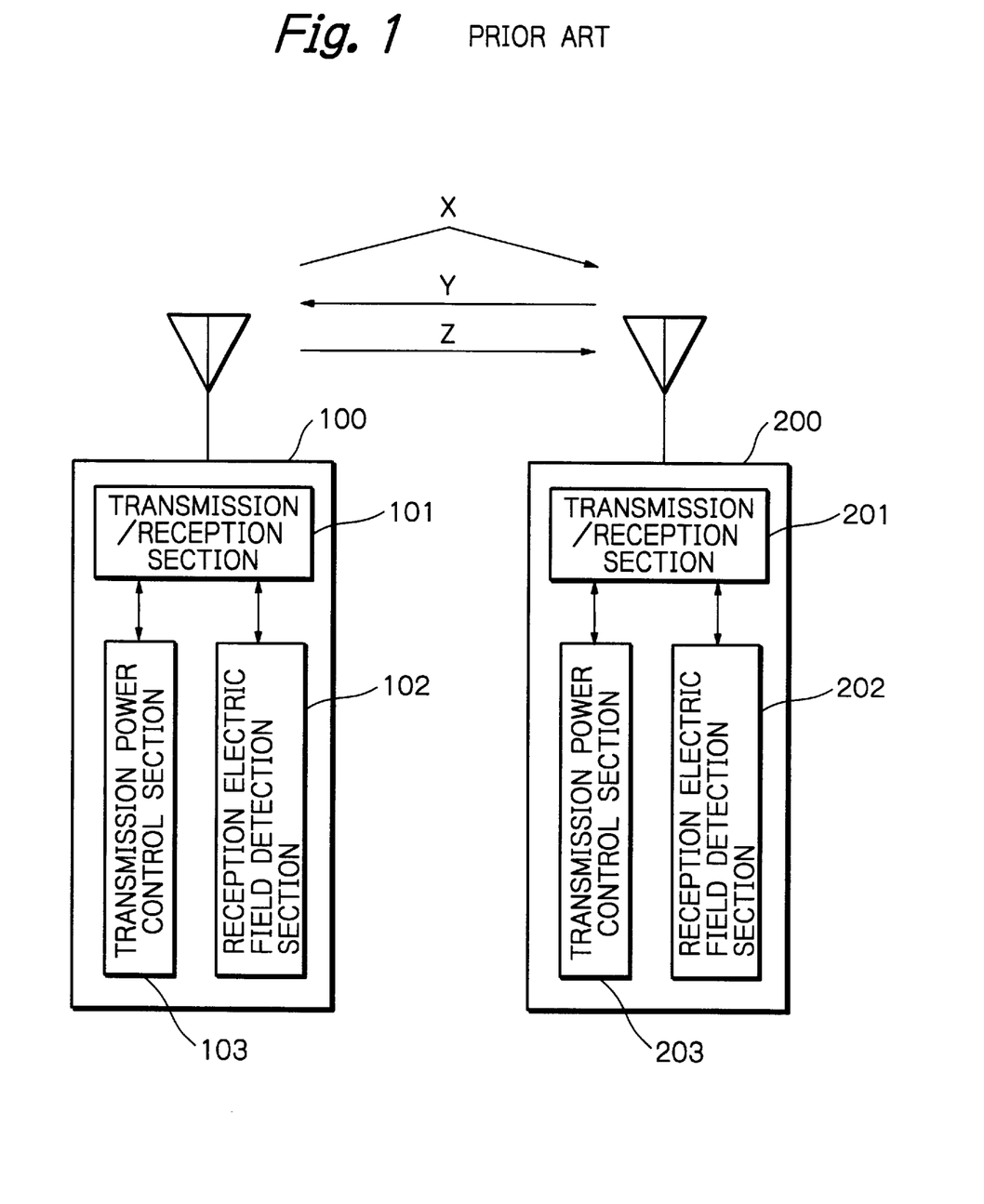
FIG. 1 is a block circuit diagram illustrating a prior art mobile radio communication system.

In FIG. 1, reference numerals 100 and 200 designate mobile stations that communicate with each other. Each of the mobile stations 100 (200) includes a transmission/reception section 101 (201), a reception electric field detection section 102 (202) and a transmission power control section 103 (203). First, in the mobile station 200, when the transmission/reception section 201 receives a radio wave signal X from the mobile station 100, the reception electric field detection section 202 detects an electric field strength of the radio wave signal X. As a result, the transmission power control section 203 determines a transmission power of a transmitting radio wave signal Y in accordance with the detected reception electric field strength of the radio wave signal X. In this case, the larger the detected reception electric field strength of the radio wave signals X, the smaller the transmission power of the radio wave signal Y.

Similarly, in the mobile station 100, when the transmission/reception section 101 receives the radio wave signal Y from the mobile station 200, the reception electric field detection section 102 detects an electric field strength of the radio wave signal Y. As a result, the transmission power control section 103 determines a transmission power of a transmitting radio wave signal Z in accordance with the detected reception electric field strength of the radio wave signal Y. In this case, the larger the detected reception electric field strength of the radio wave signals Y, the smaller the transmission power of the radio wave signal Z.

Thus, the transmission power of the radio wave signals transmitted between the mobile stations 100 and 200 can be always minimum, which decreases the power dissipation.

In the mobile communication system of FIG. 1, however, if each of the mobile stations 100 and 200 has a burst function for intermittently transmitting signals only when significant transmitting data occurs, the power dissipation is rather increased. That is, even when one of the mobile stations 100 and 200 stops transmitting of signals due to the absence of effective transmitting data, the transmission power control section of the other mobile station continues to increase the transmission power of signals. As a result, the power dissipation is rather increased.

In addition, if each of the mobile stations 100 and 200 is a mobile satellite terminal, the antenna of each of the mobile stations 100 and 200 should be directed to a satellite. In this case, however, when the direction of the antenna of one of the mobile stations 100 and 200 is deviated from the satellite, the transmission power control section of the other mobile station continues to increase the transmission power of signals, which also increases the power dissipation.

Figure 2:
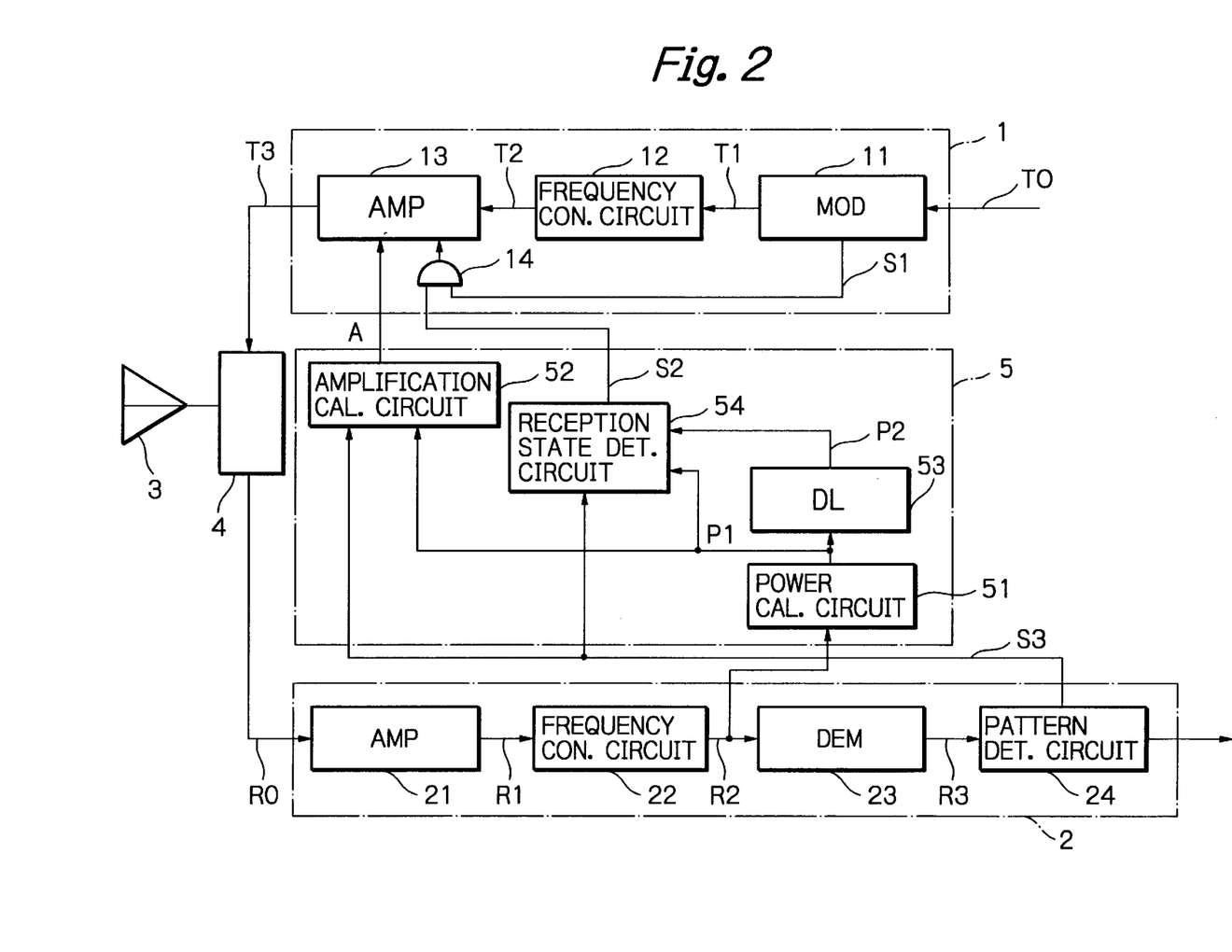
FIG. 2 is a block circuit illustrating a first embodiment of the mobile station according to the present invention.

FIG. 2 is a block circuit diagram illustrating a first embodiment of the mobile station according to the present invention. Assume that the mobile station of FIG. 2 communicates with other mobile stations via a satellite, and has a burst function for intermittently transmitting signals only when significant transmitting data occurs.

The mobile station of FIG. 2 is constructed by a transmitting section 1, a reception section 2, an antenna 3 connected via a branching circuit 4 to the transmitting circuit 1 and the reception circuit 2, and a control circuit 5 for controlling the transmitting circuit 1 and the reception circuit 2.

The transmitting circuit 1 is formed by a modulation circuit 11, a frequency conversion circuit 12 and an amplifier circuit 13, and an AND circuit 14.

Figure 3A:
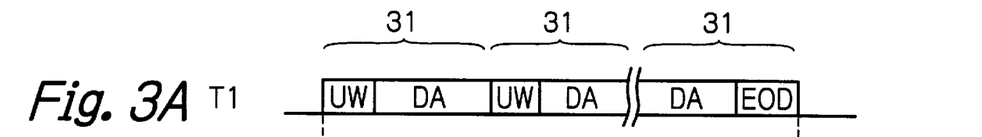
FIGS. 3A and 3B are timing diagrams of the signals within the transmitting circuit of FIG. 2.

The modulation circuit 11 receives a significant user signal T0 such as a speech signal, and performs an encoding/formatting operation upon the user signal T0. In addition, the modulation circuit 11 modulates a carrier signal with the encoded/formatted user signal, thus generating a modulation signal T1 as shown in FIG. 3A. In FIG. 3A, the encoded/formatted user signal is divided into a plurality of successive frames 31. In this case, each frame except for the last frame has a first special signal UW at its header which is a frame synchronization signal, for example, and the last frame has a second special signal EOD at its trailer. The special signals UW and EOD have different patterns from other signals. In FIG. 3A, note that "DA" designates a user signal such as a speech signal.

Figure 3B:
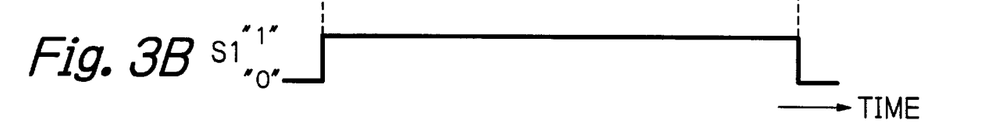

Also, the modulation circuit 11 generates a control signal S1 as shown in FIG. 3B, which the significant user signal T0 is being received. That is, when the significant user signal T0 is being received, the control signal S1 is "1", while, when the significant user signal T0 is not being received, the control signal S1 is "0".

The frequency conversion circuit 12 converts the modulation signal T1 having a baseband bandwidth into a signal T2 having a frequency band defined for a satellite communication. The signal T2 is supplied to the amplifier circuit 13.

The amplifier circuit 13 is controlled by the control signal S1 as well as a control signal S2 generated from the control circuit 5. Also, the amplification factor "A" of the amplifier circuit 13 is controlled by the control circuit 5. In this case, the control signals S1 and S2 are supplied via the AND circuit 14 to the amplifier circuit 13. Therefore, only when the control signals S1 and S2 are both "1", is the amplifier circuit 13 powered, so that the amplifier circuit 13 with the amplification factor "A" amplifies the signal T2. As a result, the signal T3 is supplied via the branching circuit 4 to the antenna 3. Thus, the signal T3 is transmitted toward the satellite and another mobile station having the same configuration as the mobile station of FIG. 2 may receive the signal T3.

The reception circuit 2 is formed by a low-noise amplifier circuit 21, a frequency conversion circuit 22, a demodulation circuit 23 and a pattern detection circuit 24.

The low-noise amplifier circuit 21 amplifies a reception signal R0 via the branching circuit 4 from the antenna 3 with a low noise, and transmits an amplified signal R1 to the frequency conversion circuit 22.

The frequency conversion circuit 22 converts the signal R1 into an analog signal having a baseband bandwidth, and performs an analog-to-digital conversion upon this analog signal to obtain a digital signal R2, which is supplied to the demodulation circuit 23.

Figure 4A:
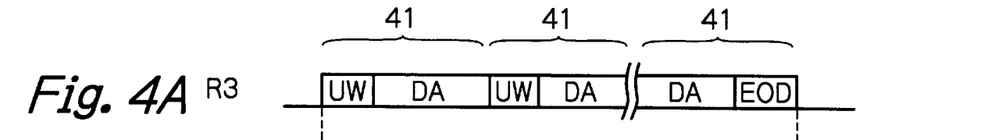
FIGS. 4A and 4B are timing diagrams of the signals within the reception circuit of FIG. 2.

The demodulation circuit 23 demodulates the digital signal R2 to generate a demodulated signal R3, as shown in FIG. 4A, which is supplied to the pattern detection circuit 24. As shown in FIG. 4A, the demodulated signal R3 has a similar format to the modulation signal T1 as shown in FIG. 3A. That is, the demodulated signal R3 is divided into a plurality of successive frames 41. In this case, each frame except for the last frame has a first special signal UW at its header, and the last frame has a second special signal EOD.

Figure 4B:
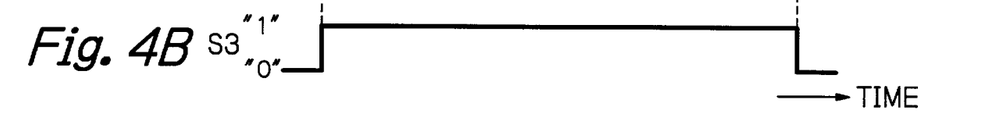
Figure 5:
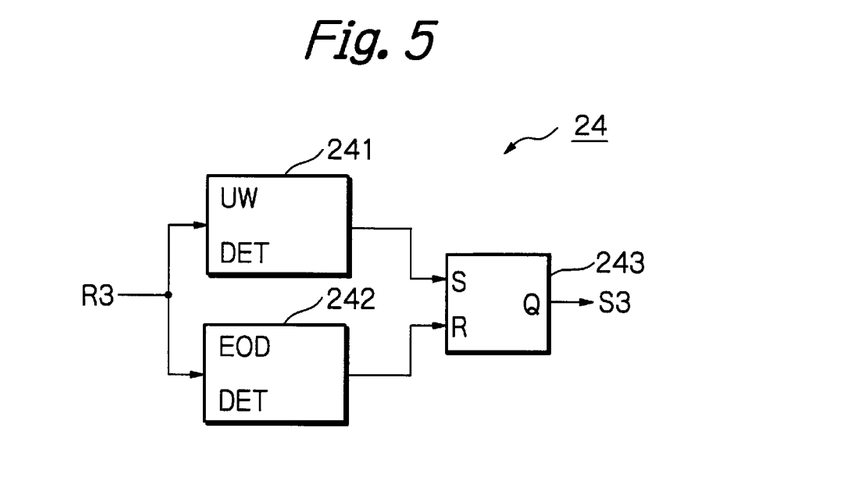
FIG. 5 is a detailed circuit diagram of the pattern detection circuit of FIG. 2.

The pattern detection circuit 24 of FIG. 2 can be constructed by a first special signal detection circuit 241, a second special signal detection circuit 242, and an RS type flip-flop 243. That is, if a first special signal UW is detected by the first special signal detection circuit 241 in the demodulated signal R3, the flip-flop 243 is set. On the other hand, if a first special signal EOD is detected by the second special signal detection circuit 242 in the demodulated signal R3, the flip-flop 243 is reset. Thus, a control signal S3 as shown in FIG. 4B can be obtained.

The control circuit 5 is formed by a power calculation circuit 51, an amplification calculation circuit 52, a delay circuit 53, and a reception state determination circuit 54.

The power calculation circuit 51 calculates a power $P_i$ for each symbol of the digital signal R2 from the frequency conversion circuit 22. Then, the power calculates an average power value P1 of the powers $P_i$ (i=1, 2, ..., N), for every N symbols, i.e., calculates the following:

$$P1 \leftarrow (P_1+P_2+ \ldots +P_n)/N$$

The average power value P1 is transmitted from the power calculation circuit 51 to the amplification calculation circuit 52 and the delay circuit 53.

The amplification calculation circuit 52 calculates the amplification factor "A" in accordance with the average power value P1 only when the control signal S3 is "1". That is, the larger the average power value, the smaller the amplification factor "A". Note that, when the control signal S3 is "0", the amplification factor "A" is unchanged.

The delay circuit 53 delays a signal showing the average power value P1 by N symbols to generate a signal showing a delayed average power value P2.

Figure 6:
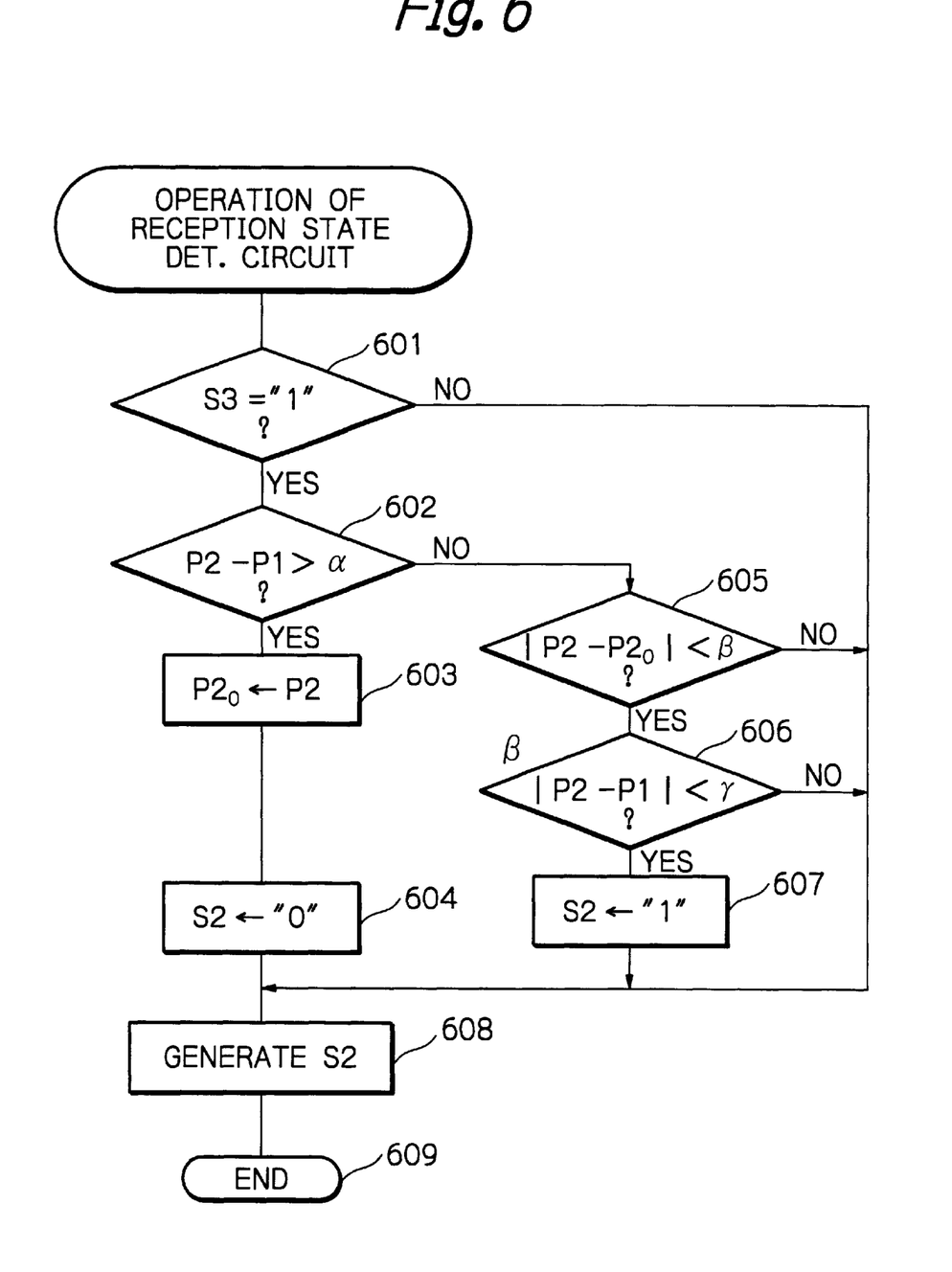
FIG. 6 is a flowchart showing the operation of the reception state determination circuit of FIG. 2.

The control signal S3 and the signals showing the average power values P1 and P2 are supplied to the reception state determination circuit 54, which operates as shown in FIG. 6. Note that a flowchart of FIG. 6 is carried out at predetermined time intervals.

First, at step 601, it is determined whether the control signal S3 is "1" or "0". Only if the control signal S3 is "1", i.e., only if a significant user signal is being received, does the control proceed to step 602. Otherwise, the control signal S2 is unchanged, and the control proceeds directly to step 608.

At step 602, it is determined whether or not the direction of the antenna 3 is deviated from the satellite by determining whether or not the following condition (1) is satisfied:

$$P2-P1>\alpha \tag{1}$$

where $\alpha$ is a positive value. Note that, if $\alpha$ is small, a small change of the direction of the antenna 3 from the satellite can be detected. As a result, if the condition (1) is satisfied, i.e., if the direction of the antenna 3 is deviated from the satellite, the control proceeds to step 603 which stores the average power value P2 as a value $P2_o$. Then, at step 604, the control signal S2 is made "0".

On the other hand, at steps 605 and 606, it is determined whether or not the direction of the antenna 3 is right toward the satellite. In more detail, at step 605, it is determined whether or not the direction of the antenna 3 becomes close to that of the antenna 3 immediately before the direction of the antenna 3 is deviated from the satellite by determining whether or not the following condition (2) is satisfied:

$$|P2=P2_o|<\beta \tag{2}$$

where $\beta$ is a positive value. In addition, at step 606, it is determined whether or not the direction of the antenna 3 is stable by determining whether or not the following condition is satisfied:

$$|P1-P2|<\gamma \tag{3}$$

where $\gamma$ is a positive value. Note that, the smaller the value $\gamma$, the higher the stability of the direction of the antenna 3. Only when the conditions (2) and (3) are both satisfied, does the control proceed to step 607 which makes the control signal S2 "1". Otherwise, the control proceeds directly to step 608.

At step 608, the control signal S2 is generated and transmitted to the AND circuit 14 of the transmission section 1. Then, the routine of FIG. 6 is completed by step 609.

The flowchart of FIG. 6 will be further explained next with reference to FIGS. 7A, 7B and 7C.

Before time t1, the direction of the antenna 3 is stable toward the satellite. As a result, P1=P2 as shown in FIGS. 7A and 7B. Therefore, if S3="1", the control proceeds from step 601 via step 605 and 606 to step 607 which maintains the control signal S2 at "1" as shown in FIG. 7C. Thus, the amplifier circuit 13 of the transmission circuit 1 is operated to carry out a transmitting operation.

At time t1, when the direction of the antenna 3 begins to deviate from the satellite, the average power value P1 is decreased. Before time t2, since the condition (1) is not satisfied, the control proceeds from step 601 via step 605 and 606 to step 607 which maintains the control signal S2 at "1" as shown in FIG. 7C. Thus, the amplifier circuit 13 of the transmission circuit 1 is still operated to carry out a transmitting operation.

At time t2, the difference between P1 and P2 is increased to satisfy the condition (1). As a result, the control proceeds from step 601 via step 602 to steps 603 and 604. Therefore, the average power value P2 is stored as $P2_o$, and the control signal S2 is made "0". Thus, the amplifier circuit 13 of the transmission circuit 1 is not operated.

Figure 7A:
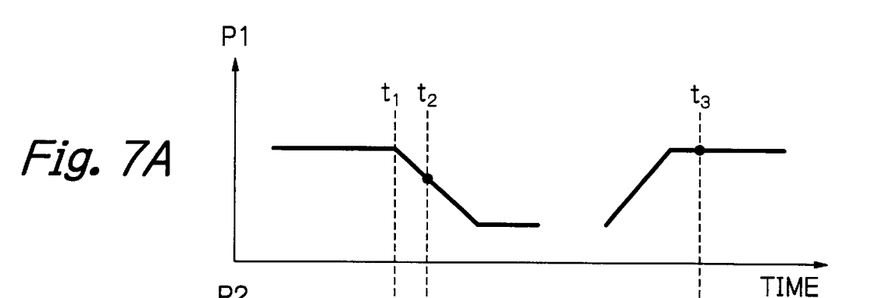
FIGS. 7A, 7B and 7C are timing diagrams showing the operation of the reception state determination circuit of FIG. 2.
Figure 7B:
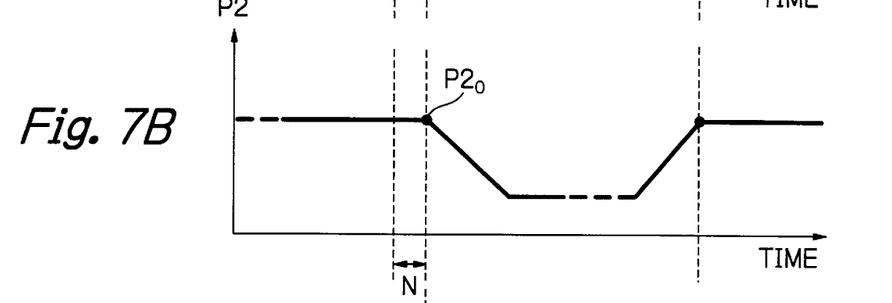
Figure 7C:
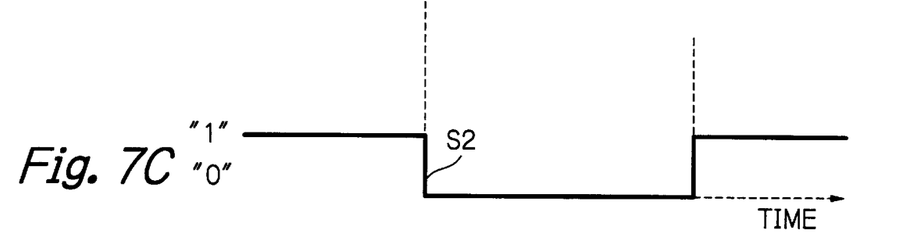

At time t3, P1=P2=$P2_o$, as shown in FIGS. 7A and 7B, so that the conditions (2) and (3) are both satisfied. Therefore, the control proceeds from step 601 via steps 602, 605 and 606 to step 607 which change the control signal S2 from "0" to "1". Thus, the amplifier circuit 13 of the transmission circuit 1 is again operated to carry out a transmitting operation.

Thus, in the first embodiment, only when the control signal S3 is "1", i.e., only when a significant user signal is being received, the amplification calculation circuit 52 calculates the amplification factor "A". Therefore, when such a significant user signal is not being received due to the deterioration of transmission performance or the like, the amplification factor "A" is never increased, thus decreasing the power dissipation. In addition, when the direction of the antenna 3 is deviated from the satellite, the reception state determination circuit 52 stops the operation of the amplifier circuit 13, so that fruitless radio wave radiation is suppressed. This also decreases the power dissipation.

Figure 8:
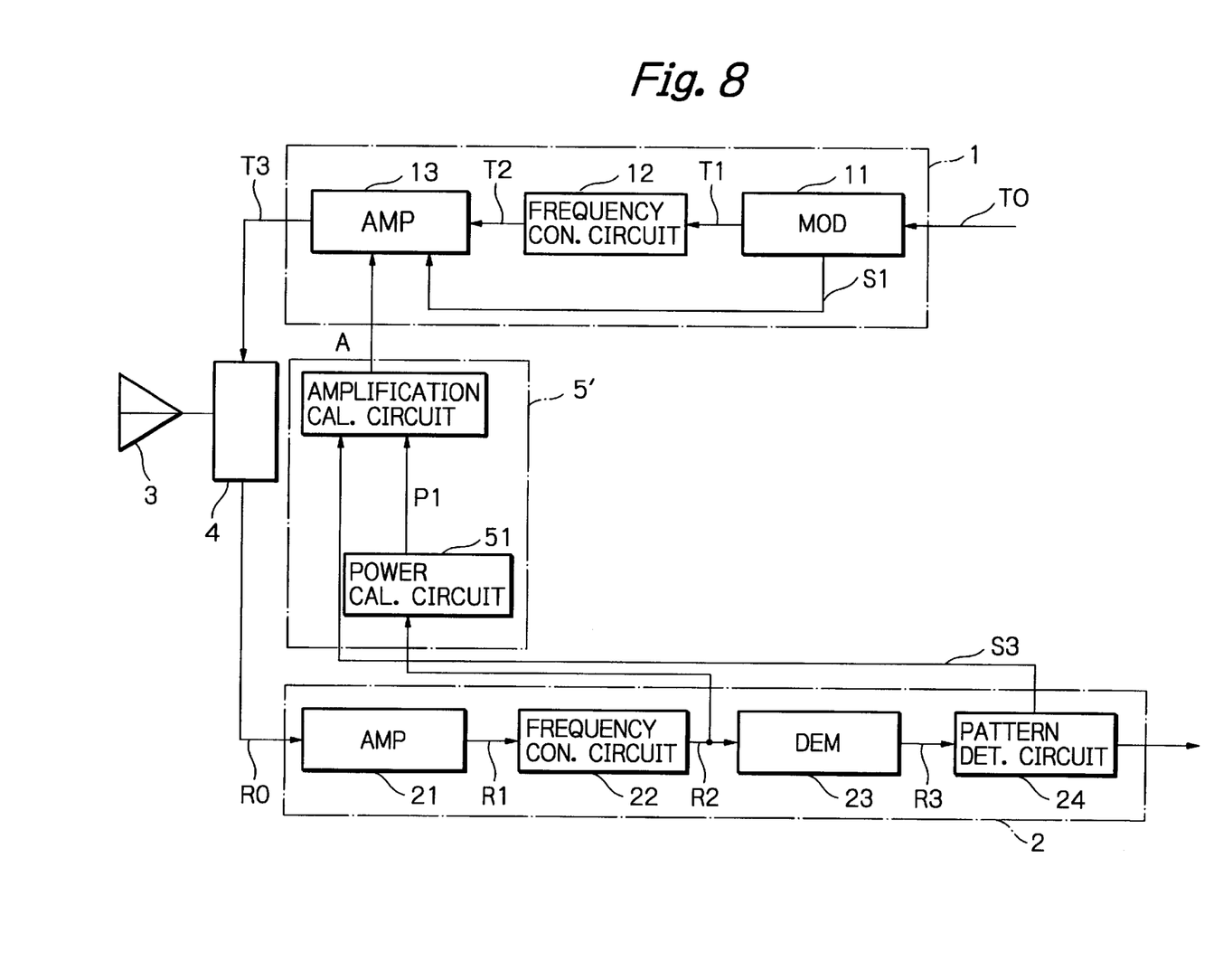
FIGS. 8 and 9 are block circuit diagrams illustrating modifications of the mobile station of FIG. 2.

The mobile station of FIG. 2 can be modified into a mobile station as illustrated in FIG. 8. In FIG. 8, the control circuit 5 of FIG. 2 is modified into a control circuit 5' which includes only the power calculation circuit 51 and the amplification calculation circuit 52 of FIG. 2. In addition, the amplifier circuit 13 is powered ON and OFF by only the control signal S1. In this case, when a significant user signal is not being received due to the deterioration of transmission performance or the like, the amplification factor "A" is never increased, thus decreasing the power dissipation. However, even when the direction of the antenna 3 is deviated from the satellite, the operation of the amplifier circuit 13 never stops.

Figure 9:
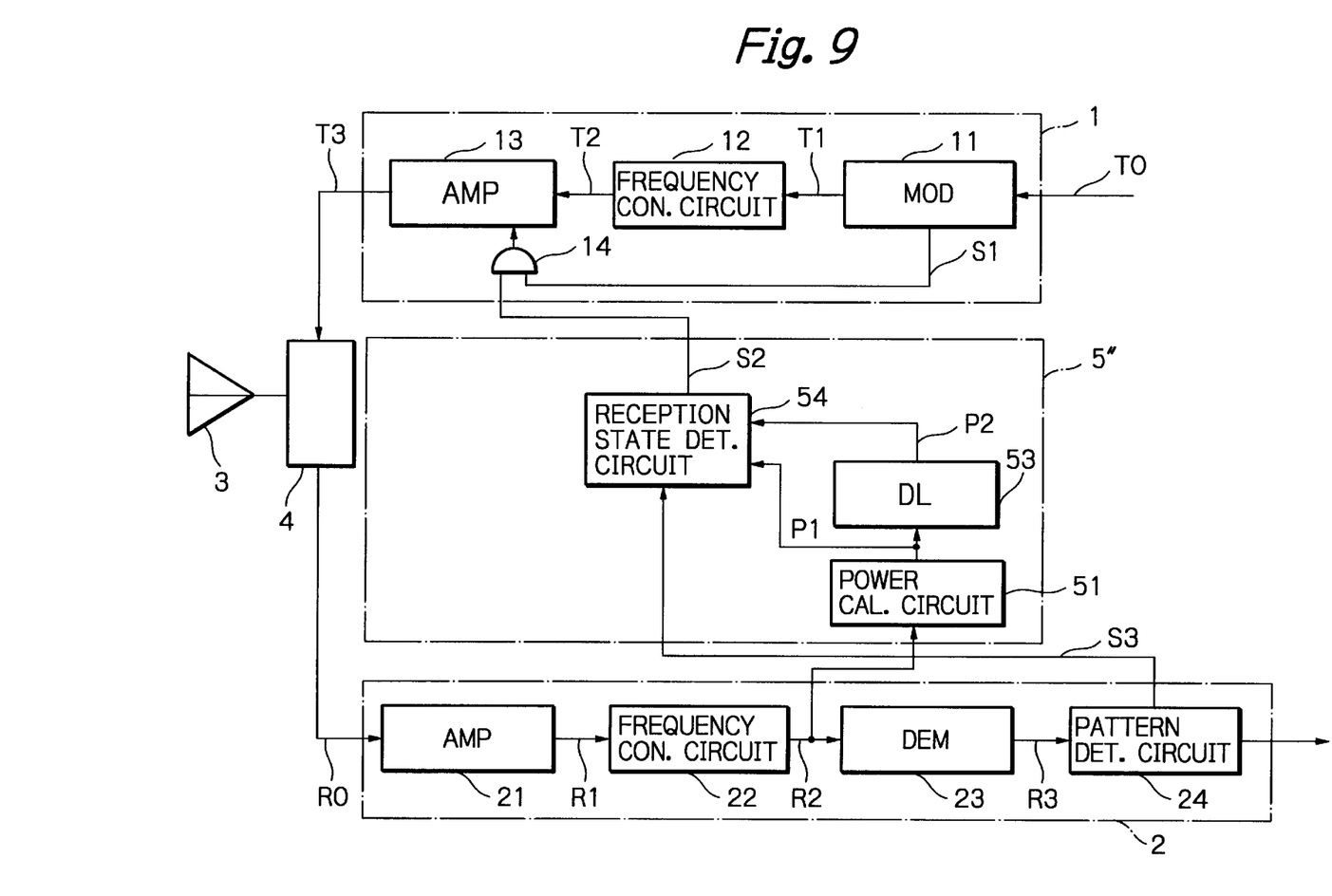

The mobile station of FIG. 2 can be modified into a mobile station as illustrated in FIG. 9. In FIG. 9, the control circuit 5 of FIG. 2 is modified into a control circuit 5" which includes only the power calculation circuit 51', the delay circuit 53 and the reception state determination circuit 54 of FIG. 2. Therefore, the amplication factor "A" of the amplifier circuit 13 is not changed. In this case, when the direction of the antenna 3 is deviated from the satellite, the reception state determination circuit 52 stops the operation of the amplifier circuit 13, so that erroneous radio wave radiation is suppressed. This also decreases the power dissipation.

Figure 10:
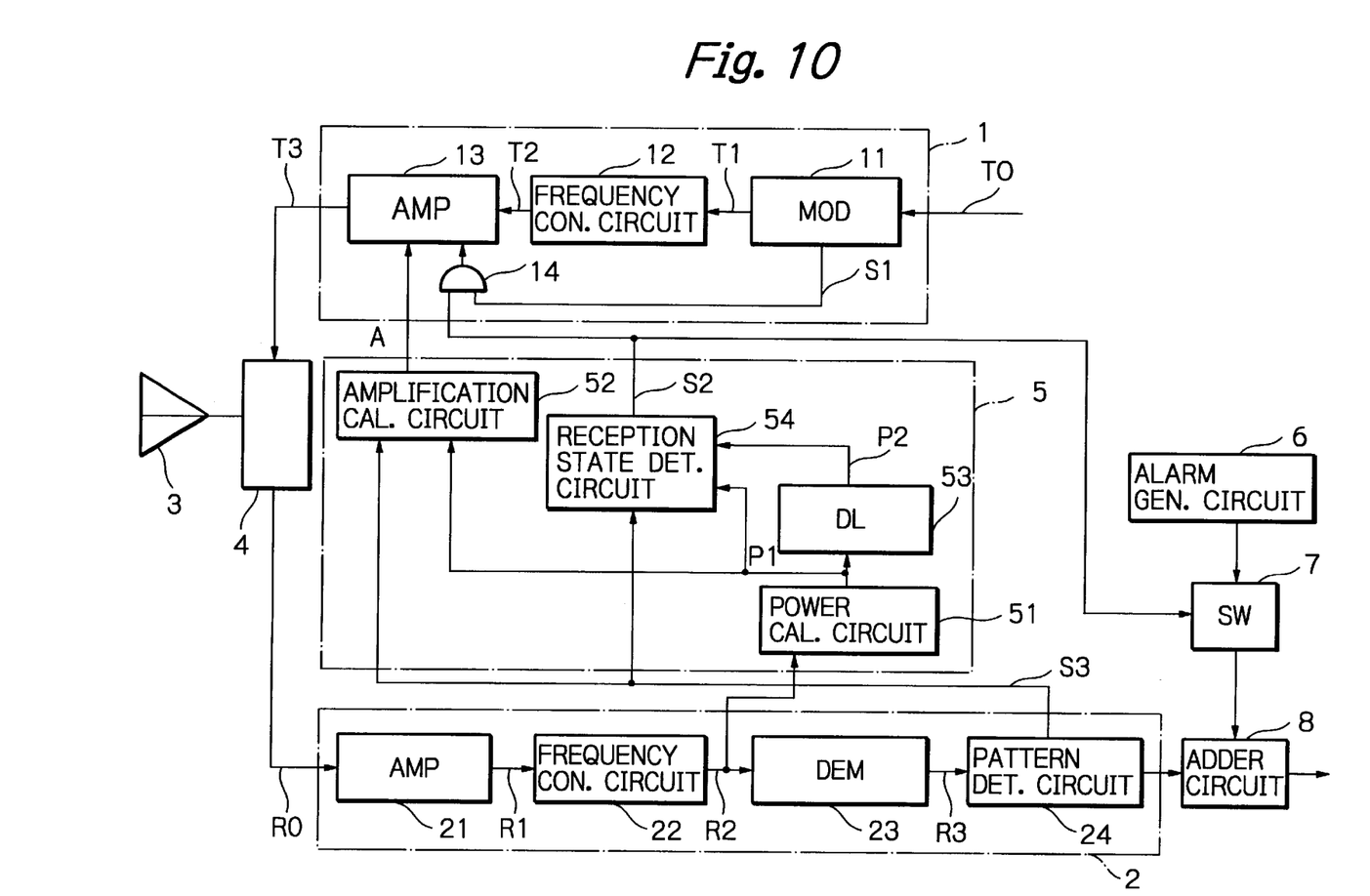
FIG. 10 is a block circuit diagram illustrating a second embodiment of the mobile station according to the present invention.

In FIG. 10, which illustrates a second embodiment of the present invention, an alarm generation circuit 6, a switch circuit 7 and an adder circuit 8 are added to the elements of FIG. 2.

The alarm generation circuit 6 generates an alarm signal for producing an alarm sound. The switch circuit 7 is operated in response to the control signal S2 of the control circuit 5. In this case, when the control signal S2 is "0", the switch circuit 7 is turned ON so that the alarm generation circuit 6 is electrically connected to the adder circuit 8. Therefore, the alarm signal is added by the adder circuit 8 to an output signal of the pattern detection circuit 24, thus producing an alarm sound for a user.

Note that, if the direction of the antenna 3 is completely deviated from the satellite, the amplifier circuit 13 is turned OFF. However, if the direction of the antenna 3 is a little deviated from the satellite, the amplifier circuit 13 may or may not be turned OFF. In this case, the user may continue his or her speech. In such a case, since the user recognizes the deviation of the direction of the antenna 3 by an alarm sound, the user can correct the direction of the antenna 3, thus restarting his or her speech.

Note that the alarm generation circuit 6, the switch 7 and the adder circuit 8 can be provided in the mobile station of FIG. 9.

Also, in the above-mentioned embodiments, although the first special signal UW is constructed by a frame synchronization, the first special signal UW can be contructed by other signals.

As explained hereinabove, according to the present invention, since the amplification factor of a transmitting signal is changed only when a significant user signal is being received, the power of the transmitting signal is never made higher than is expected, the power dissipation can be decreased. In addition, when the direction of an antenna is deviated from a satellite, the transmission of a signal is stopped. Therefore, fruitless signal transmission is suppressed, thus decreasing the power dissipation.

What is claimed is:

1. A mobile radio communication apparatus comprising:
    a transmission circuit for intermittently transmitting first significant signals;
    a reception circuit for receiving second significant signals; and
    a control circuit, connected between said reception circuit and said transmission circuit, for changing a strength of said first significant signals in accordance with a strength of said second significant signals only when said second significant signals are being received by said reception circuit.

2. The apparatus as set forth in claim 1, wherein each of said first and second significant signals has a first special signal at a header and a second special signal at a trailer,
    said reception circuit including
        a pattern detection circuit for detecting said first and second special signals in said second significant signals and generating a first control signal from a timing when said first special signal is detected to a timing when said second special signal is detected,
    said control circuit including:
        a power calculation circuit, connected to said reception circuit, for calculating a strength of said second significant signals; and
        an amplification calculation circuit, connected to said pattern detection circuit and said power calculation circuit, for calculating an amplification factor in accordance with the strength of said second significant signals only when said first control signal is being generated,
    said transmission circuit including an amplifier circuit, connected to said amplification calculation circuit, for adjusting the strength of said first significant signals using said amplification factor.

3. The apparatus as set forth in claim 2, wherein said control circuit further comprises:
    a delay circuit, connected to said power calculation circuit, for delaying the strength of said second significant signals;
    a reception state determination circuit, connected to said pattern detection circuit, said power calculation circuit and said delay circuit, for generating a second control signal for stopping transmission of said first significant signals when a difference between the strength of said second significant signals and the delayed strength of said second significant signals becomes larger than a first determined value and said first control signal is generated,
    said second control signal being supplied to said amplifier circuit, so that said amplifier circuit is turned OFF.

4. The apparatus as set forth in claim 3, wherein said reception state determination circuit stores the delayed strength of said second significant signals when the difference between the strength of said second significant signals and the delayed strength of said second significant signals becomes larger than said first predetermined value, said reception state determination circuit stops generation of said second control signal when a difference between the delayed strength of said second significant signals and the stored strength of said second significant signals becomes smaller than a second predetermined value and the difference between the strength of said second significant signals and the delayed strength of said second significant signals becomes smaller than a third predetermined value.

5. The apparatus as set forth in claim 1, wherein said control circuit stops transmission of said first significant signals when the strength of said second significant signals is decreased by an amount larger than a predetermined value.

6. The apparatus as set forth in claim 5, wherein said control circuit restarts the transmission of said first significant signals when the strength of said second significant signals is restored.

7. The apparatus as set forth in claim 5, further comprising:
    an alarm generation circuit for generating an alarm signal;
    a switch circuit, connected to said alarm generation circuit and said control circuit, for passing said alarm signal when said control circuit stops the transmission of said first significant signals;
    an adder circuit, connected to said switch circuit and said reception circuit, for adding said alarm signal to said second significant signals.

8. The apparatus as set forth in claim 5, further comprising:
    an alarm generation circuit for generating an alarm signal;
    a switch circuit, connected to said alarm generation circuit and said reception state determination circuit, for passing said alarm signal when said reception state determination circuit generates said second control signal;
    an adder circuit, connected to said switch circuit and said reception circuit, for adding said alarm signal to said second significant signals.

9. A mobile radio communication apparatus comprising:
    a transmission circuit for intermittently transmitting first significant signals;
    a reception circuit for receiving second significant signals;
    a control circuit, connected between said reception circuit and said transmission circuit, for stopping transmission of said first significant signals when the strength of said second significant signals is decreased by an amount larger than a predetermined value;
    an alarm generation circuit for generating an alarm signal when said decrease by said amount is larger than said predetermined value;
    a switch circuit, connected to said alarm generation circuit and said control circuit, for passing said alarm signal when said control circuit stops the transmission of said first significant signals; and
    an adder circuit, connected to said switch circuit and said reception circuit, for adding said alarm signal to said second significant signals.

10. A mobile radio communication apparatus comprising:
    a transmission circuit for intermittently transmitting first significant signals;
    a reception circuit for receiving second significant signals; and a control circuit, connected between said reception circuit and said transmission circuit, for stopping transmission of said first significant signals when the strength of said second significant signals is decreased by an amount larger than a predetermined value, wherein each of said first and second significant signals has a first special signal at a header and a second special signal at a trailer, said reception circuit including a pattern detection circuit for detesting said first and second special signals in said second significant signals and generating a first control signal from a timing when said first special signal is detected to a timing when said second special signal is detected, wherein said control circuit comprises:
a power calculation circuit, connected to said reception circuit, for calculating a strength of said second significant signals;
a delay circuit, connected to said power calculation circuit, for delaying the strength of said second significant signals; and
a reception state determination circuit connected to said pattern detection circuit, said power calculation circuit and said delay circuit, for generating a second control signal for stopping transmission of said first significant signals when a difference between the strength of said second significant signals and the delayed strength of said second significant signals becomes larger than a first predetermined value and said first control signal is generated, said second control signal being supplied to said amplifier circuit, so that said amplifier circuit is turned OFF.

11. The apparatus as set forth in claim 10, wherein said reception state determination circuit stores the delayed strength of said second significant signals when the difference between the strength of said second significant signals and the delayed strength of said second significant signals becomes larger than said first predetermined value, said reception state determination circuit stops generation of said second control signal when a difference between the delayed strength of said second significant signals and the stored strength of said second significant signals becomes smaller than a second predetermined value and the difference between the strength of said second significant signals and the delayed strength of said second significant signals becomes smaller than a third predetermined value.

12. The apparatus as set forth in claim 10, further comprising:
an alarm generation circuit for generating an alarm signal;
a switch circuit, connected to said alarm generation circuit and said reception state determination circuit, for passing said alarm signal when said reception state determination circuit generates said second control signal;
an adder circuit, connected to said switch circuit and said reception circuit, for adding said alarm signal to said second significant signals.

13. A mobile radio communication apparatus comprising:
means for calculating a strength of a received signal;
means for detecting a first special signal at a header of said received signal and a second special signal at a trailer of said received signal to generate a first control signal from a timing when said first special signal is detected to a timing when said second special signal is detected;
means for calculating an amplification factor in accordance with the strength of said received signal when said first control signal is being received; and means for adjusting a strength of a transmitting signal in accordance with said amplification factor.

14. The apparatus as set forth in claim 13, further comprising:
means for delaying the strength of said received signal;
means for determining whether or not a difference between the strength of said received signal and the delayed strength of said received signal is larger than a predetermined value when said first control signal is being generated;
means for generating a second control signal when the difference between the strength of said received signal and the delayed strength of said received signal is larger than said first predetermined value; and
means for stopping transmission of said transmitting signal when said second control signal is being generated.

15. The apparatus as set forth in claim 14, further comprising:
means for storing the delayed strength of said received signal when the difference between the strength of said received signal and the delayed strength of said received signal is larger than said first predetermined value;
means for determining whether or not a difference between the delayed strength of said received signal and the stored strength of said received signal is smaller than a second predetermined value when said first control signal is being generated;
means for determining whether or not the difference between the strength of said received signal and the delayed strength of said received signal is smaller than a third predetermined value when said first control signal is being generated; and
means for stopping generation of said second control signal when the difference between the delayed strength of said received signal and the stored strength of said received signal is smaller than said second predetermined value and the difference between the strength of said received signal and the delayed strength of said received signal is smaller than said third predetermined value.

16. The apparatus as set forth in claim 13, further comprising means for adding an alarm signal to said received signal when said second control signal is being generated.

17. A mobile radio communication apparatus comprising:
means for calculating a strength of a received signal;
means for detecting a first special signal at a header of said received signal and a second special signal at a trailer of said received signal to generate a first control signal from a timing when said first special signal is detected to a timing when said second special signal is detected;
means for delaying the strength of said received signal;
means for determining whether or not a difference between the strength of said received signal and the delayed strength of said received signal is larger than a predetermined value when said first control signal is being generated;
means for generating a second control signal when the difference between the strength of said received signal and the delayed strength of said received signal is larger than said first predetermined value; and
means for stopping transmission of said transmitting signal when said second control signal is being generated.

18. The apparatus as set forth in claim 17, further comprising:
- means for storing the delayed strength of said received signal when the difference between the strength of said received signal and the delayed strength of said received signal is larger than said first predetermined value;
- means for determining whether or not a difference between the delayed strength of said received signal and the stored strength of said received signal is smaller than a second predetermined value when said first control signal is being generated;
- means for determining whether or not the difference between the strength of said received signal and the delayed strength of said received signal is smaller than a third predetermined value when said first control signal is being generated; and
- means for stopping generation of said second control signal when the difference between the delayed strength of said received signal and the stored strength of said received signal is smaller than said second predetermined value and the difference between the strength of said received signal and the delayed strength of said received signal is smaller than said third predetermined value.

19. The apparatus as set forth in claim 17, further comprising means for adding an alarm signal to said received signal when said second control signal is being generated.

* * * * *